United States Patent
Fujishiro

(10) Patent No.: US 12,490,143 B2
(45) Date of Patent: Dec. 2, 2025

(54) COMMUNICATION CONTROL METHOD AND RELAY USER EQUIPMENT

(71) Applicant: KYOCERA Corporation, Kyoto (JP)

(72) Inventor: Masato Fujishiro, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 454 days.

(21) Appl. No.: 17/934,456

(22) Filed: Sep. 22, 2022

(65) Prior Publication Data

US 2023/0020973 A1   Jan. 19, 2023

Related U.S. Application Data

(63) Continuation of application No. PCT/JP2021/010270, filed on Mar. 15, 2021.

(30) Foreign Application Priority Data

Mar. 25, 2020 (JP) ................... 2020-055105

(51) Int. Cl.
*H04W 88/04* (2009.01)
*H04W 28/02* (2009.01)

(52) U.S. Cl.
CPC ... *H04W 28/0278* (2013.01); *H04W 28/0252* (2013.01); *H04W 88/04* (2013.01)

(58) Field of Classification Search
CPC ..... H04W 28/12; H04W 28/14; H04W 40/22; H04W 72/04; H04W 72/21; H04W 72/52; H04W 88/04; H04W 28/0278
USPC ............................. 370/252, 312, 329
See application file for complete search history.

(56) References Cited

U.S. PATENT DOCUMENTS

| | | | |
|---|---|---|---|
| 2012/0044852 A1 | 2/2012 | Zhang et al. | |
| 2012/0236782 A1 | 9/2012 | Bucknell et al. | |
| 2018/0152920 A1* | 5/2018 | Zhao | H04W 40/22 |
| 2020/0305165 A1* | 9/2020 | Inokuchi | H04W 88/04 |

FOREIGN PATENT DOCUMENTS

| | | |
|---|---|---|
| JP | 2013-515420 A | 5/2013 |
| JP | 2018-023147 A | 2/2018 |
| WO | 2014/179722 A1 | 11/2014 |

OTHER PUBLICATIONS

OPPO; "New SID: Study on NR Sidelink Relay"; 3GPP TSG RAN Meeting #86; RP-193253; Dec. 9-12, 2019; pp. 1-5; Sitges, Spain.

* cited by examiner

*Primary Examiner* — Harun Chowdhury
(74) *Attorney, Agent, or Firm* — Studebaker Brackett PLLC

(57) ABSTRACT

A communication control method includes receiving, by a relay user equipment, data transmitted from a remote user equipment on a sidelink, transmitting, from the relay user equipment to a base station and on an uplink, the data received from the remote user equipment, and transmitting, from the relay user equipment to the remote user equipment, restriction information restricting an amount of data to be transmitted by the remote user equipment.

5 Claims, 10 Drawing Sheets

COMMUNICATION CONTROL METHOD AND RELAY USER EQUIPMENT

RELATED APPLICATIONS

The present application is a continuation based on PCT Application No. PCT/JP2021/010270, filed on Mar. 15, 2021, which claims the benefit of Japanese Patent Application No. 2020-055105 filed on Mar. 25, 2020. The content of which is incorporated by reference herein in their entirety.

TECHNICAL FIELD

The present invention relates to a communication control method and a relay user equipment used in a mobile communication system.

BACKGROUND ART

A sidelink relay technique in which a user equipment is used as a relay node in a mobile communication system based on the 3rd Generation Partnership Project (3GPP) standard has been studied. The sidelink relay is a technique in which a relay node referred to as a relay user equipment (Relay UE) intervenes in communication between a base station and a remote user equipment (Remote UE) and performs relay for the communication.

CITATION LIST

Non-Patent Literature

Non-Patent Literature 1: 3GPP Contribution "RP-193253", the Internet <URL: https://www.3gpp.org/ftp/tsg_ran/TSG_RAN/TSGR_86/Docs/RP-193253.zip>

SUMMARY OF INVENTION

A communication control method according to a first aspect includes the steps of receiving, by a relay user equipment, data transmitted from a remote user equipment on a sidelink, transmitting, from the relay user equipment to a base station and on an uplink, the data received from the remote user equipment, and transmitting, from the relay user equipment to the remote user equipment, restriction information restricting an amount of data to be transmitted by the remote user equipment.

A communication control method according to a second aspect includes the steps of receiving, by a relay user equipment, data transmitted from a remote user equipment on a sidelink, transmitting, from the relay user equipment to a base station and on an uplink, the data received from the remote user equipment, and transmitting first desire information from one of user equipment out of the remote user equipment and the relay user equipment to the other user equipment out of the remote user equipment and the relay user equipment. The first desire information is information indicating a desired amount of data transmission to be transmitted from the remote user equipment on the sidelink.

A communication control method according to a third aspect includes the steps of receiving, by a relay user equipment, data transmitted from a remote user equipment on a sidelink using a sidelink radio resource allocated by a base station, transmitting, from the relay user equipment to the base station and on an uplink, the data received from the remote user equipment, and transmitting, from the relay user equipment to the base station and on the uplink, request information requesting an adjustment of an amount of sidelink radio resources.

A relay user equipment according to a fourth aspect executes the communication control method according to any one of the first to third aspects.

DESCRIPTION OF EMBODIMENTS

If an uplink communication band between a relay user equipment and a base station is insufficient in a case in which the relay user equipment transmits, to the base station, data transmitted from a remote user equipment on a sidelink, overflow of a buffer (uplink buffer) of the relay user equipment may occur and communication disconnection may occur.

Therefore, an object of the present disclosure is to curb occurrence of the overflow of the uplink buffer of the relay user equipment.

A mobile communication system according to an embodiment will be described with reference to the drawings. In the description of the drawings, the same or similar parts are denoted by the same or similar reference signs.

Configuration of Mobile Communication System

Figure 1:
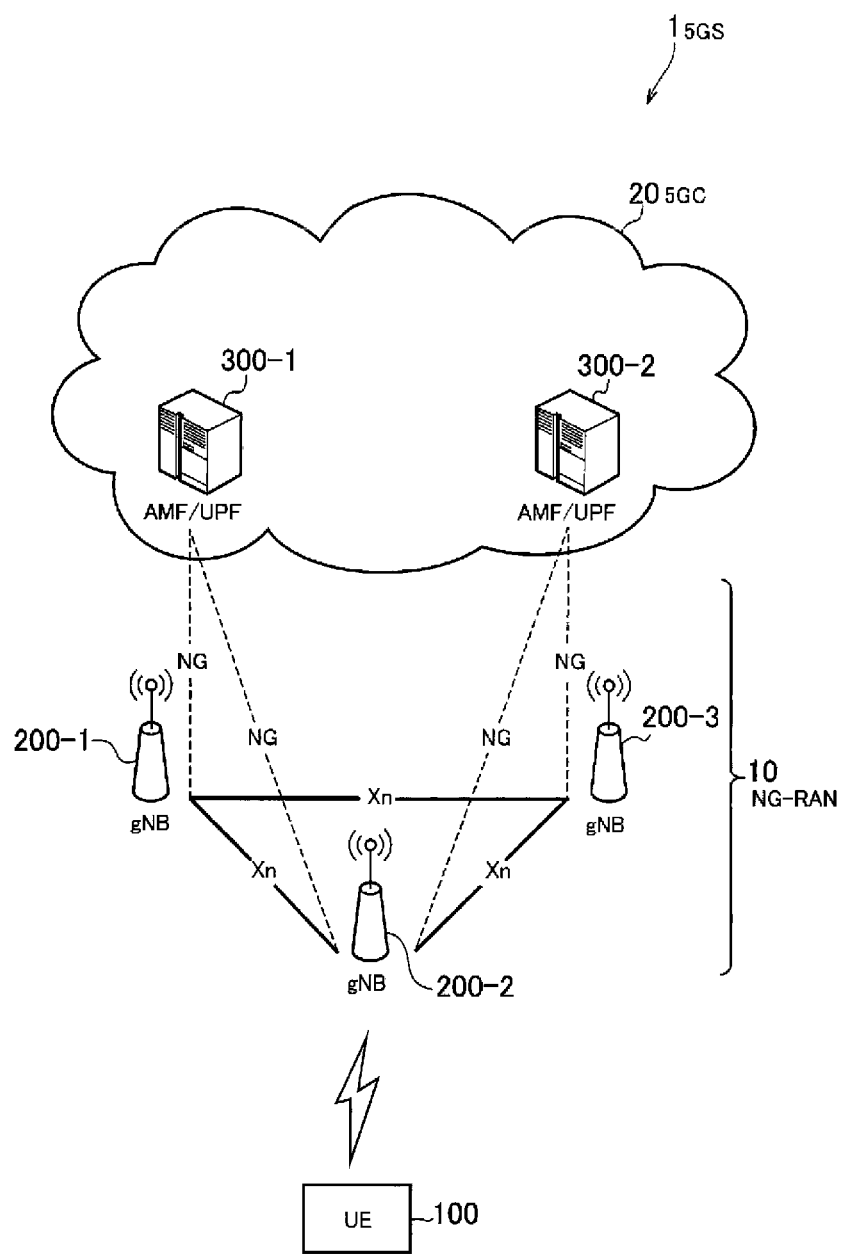
FIG. 1 is a diagram illustrating a configuration of a mobile communication system according to an embodiment.

First, a configuration of a mobile communication system according to an embodiment will be described. FIG. 1 is a diagram illustrating a configuration of the mobile communication system according to an embodiment. This mobile communication system is based on the 5th Generation System (5GS) of the 3GPP standard. Although the following description will be given by exemplifying the 5GS, a Long Term Evolution (LTE) system may be at least partially applied to the mobile communication system.

As illustrated in FIG. 1, the 5GS 1 includes a user equipment (UE) 100, a 5G radio access network (next generation radio access network (NG-RAN)) 10, and a 5G core network (5GC) 20.

The UE 100 is a mobile wireless communication apparatus. The UE 100 may be any apparatus as long as the apparatus is used by a user. Examples of the UE 100 include a mobile phone terminal (including a smartphone), a tablet terminal, a laptop PC, a communication module (including a communication card or a chipset), a sensor or an apparatus provided in the sensor, a vehicle or an apparatus (Vehicle UE) provided in the vehicle, and/or a flying object or an apparatus (Aerial UE) provided in the flying object.

The NG-RAN 10 includes base stations (referred to as "gNBs" in the 5G system) 200. The gNBs 200 are connected to each other via an Xn interface, which is an inter-base station interface. The gNB 200 manages one or a plurality of cells. The gNB 200 performs wireless communication with the UE 100 that has established connection with a cell of the gNB 200. The gNB 200 includes a radio resource management (RRM) function, a function of routing user data (hereinafter simply referred to as "data"), a measurement control function for mobility control and scheduling, and/or the like. The "cell" is used as a term denoting a minimum unit of a wireless communication area. The "cell" is also used as a term denoting a function or a resource for performing wireless communication with the UE 100. One cell belongs to one carrier frequency.

Note that a gNB can also be connected to an Evolved Packet Core (EPC), which is a core network of the LTE. A base station of the LTE can also be connected to the 5GC. The base station of the LTE and a gNB can also be connected via an inter-base station interface.

The 5GC 20 includes an Access and Mobility Management Function (AMF) and a User Plane Function (UPF) 300. The AMF performs various types of mobility control and the like for the UE 100. The AMF manages mobility of the UE 100 through communication with the UE 100 using Non-Access Stratum (NAS) signaling. The UPF performs transfer control of data. The AMF and the UPF are connected to the gNB 200 via an NG interface being an interface between the base station and the core network.

Figure 2:
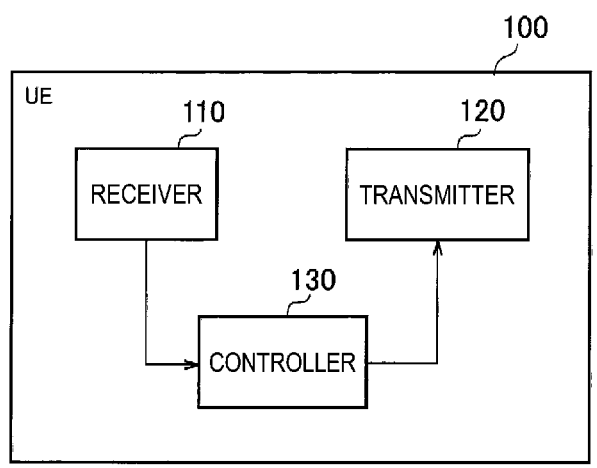
FIG. 2 is a diagram illustrating a configuration of a user equipment (UE) according to an embodiment.

FIG. 2 is a diagram illustrating a configuration of the UE 100 (user equipment).

As illustrated in FIG. 2, the UE 100 includes a receiver 110, a transmitter 120, and a controller 130.

The receiver 110 performs various kinds of reception under control of the controller 130. The receiver 110 includes an antenna and a reception device. The reception device converts a radio signal received by the antenna into a baseband signal (reception signal) and outputs the baseband signal to the controller 130.

The transmitter 120 performs various kinds of transmission under control of the controller 130. The transmitter 120 includes an antenna and a transmission device. The transmission device converts a baseband signal (transmission signal) output by the controller 130 into a radio signal and transmits the radio signal from the antenna.

The controller 130 performs various kinds of control for the UE 100. The controller 130 includes at least one processor and at least one memory. The memory stores programs to be executed by the processor and information to be used for processing performed by the processor. The processor may include a baseband processor and a Central Processing Unit (CPU). The baseband processor performs modulation and demodulation, and coding and decoding of a baseband signal, and the like. The CPU executes the programs stored in the memory to perform various kinds of processing.

Figure 3:
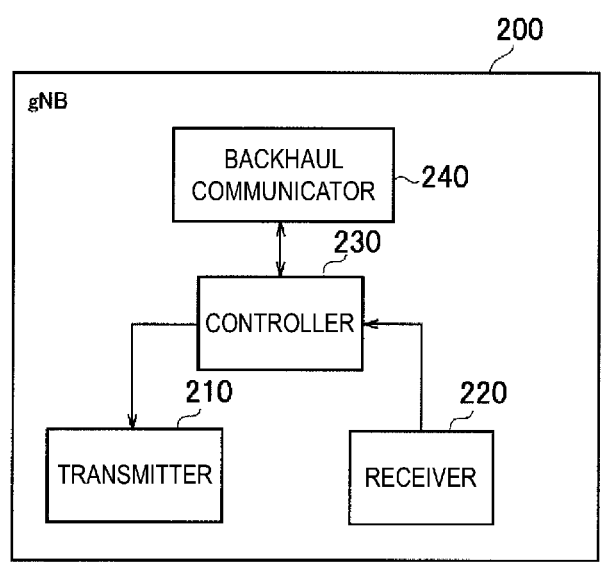
FIG. 3 is a diagram illustrating a configuration of a base station (gNB) according to an embodiment.

FIG. 3 is a diagram illustrating a configuration of the gNB 200 (base station).

As illustrated in FIG. 3, the gNB 200 includes a transmitter 210, a receiver 220, a controller 230, and a backhaul communicator 240.

The transmitter 210 performs various kinds of transmission under control of the controller 230. The transmitter 210 includes an antenna and a transmission device. The transmission device converts a baseband signal (transmission signal) output by the controller 230 into a radio signal and transmits the radio signal from the antenna.

The receiver 220 performs various kinds of reception under control of the controller 230. The receiver 220 includes an antenna and a reception device. The reception device converts a radio signal received by the antenna into a baseband signal (reception signal) and outputs the baseband signal to the controller 230.

The controller 230 performs various kinds of control for the gNB 200. The controller 230 includes at least one processor and at least one memory. The memory stores programs to be executed by the processor and information to be used for processing performed by the processor. The processor may include a baseband processor and a CPU. The baseband processor performs modulation and demodulation, and coding and decoding of a baseband signal, and the like. The CPU executes the programs stored in the memory to perform various kinds of processing.

The backhaul communicator 240 is connected to a neighboring base station via an inter-base station interface. The backhaul communicator 240 is connected to an AMF/UPF 300 via a base station-core network interface. Note that the gNB may be composed of (in other words, functionally split into) a Central Unit (CU) and a Distributed Unit (DU), and both the units may be connected by an F1 interface.

Figure 4:
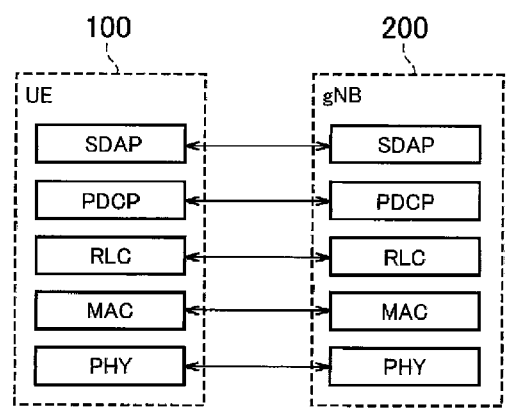
FIG. 4 is a diagram illustrating a configuration of a protocol stack of a radio interface of a user plane.

FIG. 4 is a diagram illustrating a configuration of a protocol stack of a radio interface in a user plane that handles data.

As illustrated in FIG. 4, the radio interface protocol of the user plane includes a physical (PHY) layer, a Medium Access Control (MAC) layer, a Radio Link Control (RLC) layer, a Packet Data Convergence Protocol (PDCP) layer, and a Service Data Adaptation Protocol (SDAP) layer.

The PHY layer performs coding and decoding, modulation and demodulation, antenna mapping and antenna demapping, and resource mapping and resource demapping. Between the PHY layer of the UE 100 and the PHY layer of the gNB 200, data and control information are transmitted via a physical channel.

The MAC layer performs priority control of data, retransmission processing using a hybrid ARQ (HARQ), a random access procedure, and the like. Between the MAC layer of the UE 100 and the MAC layer of the gNB 200, data and control information are transmitted via a transport channel. The MAC layer of the gNB 200 includes a scheduler. The scheduler determines transport formats (transport block sizes, modulation and coding schemes (MCSs)) in the uplink and the downlink and determines resource blocks to be allocated to the UE 100.

The RLC layer transmits data to the RLC layer on the reception end by using functions of the MAC layer and the PHY layer. Between the RLC layer of the UE 100 and the RLC layer of the gNB 200, data and control information are transmitted via a logical channel.

The PDCP layer performs header compression and header decompression, and encryption and decryption.

The SDAP layer maps an IP flow being a unit in which the core network performs QoS control onto a radio bearer being a unit in which the access stratum (AS) performs QoS control. Note that, when the RAN is connected to the EPC, the SDAP may not be provided.

Figure 5:
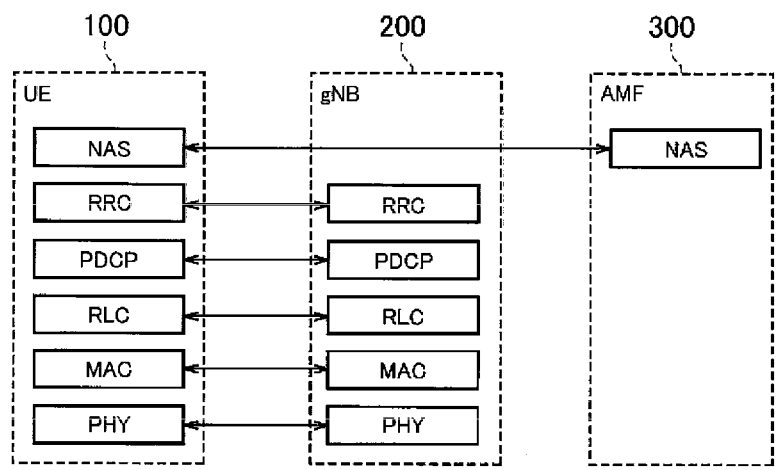
FIG. 5 is a diagram illustrating a configuration of a protocol stack of a radio interface of a control plane.

FIG. 5 is a diagram illustrating a configuration of a protocol stack of a radio interface of a control plane that handles signaling (control signal).

As illustrated in FIG. 5, the protocol stack of the radio interface of the control plane includes a Radio Resource Control (RRC) layer and a Non-Access Stratum (NAS) layer instead of the SDAP layer illustrated in FIG. 4.

Between the RRC layer of the UE 100 and the RRC layer of the gNB 200, RRC signaling for various configurations is transmitted. The RRC layer controls a logical channel, a transport channel, and a physical channel according to establishment, reestablishment, and release of a radio bearer. When there is connection (RRC connection) between the RRC of the UE 100 and the RRC of the gNB 200, the UE 100 is in an RRC connected mode. When there is no connection (RRC connection) between the RRC of the UE 100 and the RRC of the gNB 200, the UE 100 is in an RRC idle mode.

The NAS layer located in a layer higher than the RRC layer performs session management, mobility management, and the like. Between the NAS layer of the UE 100 and the NAS layer of the AMF 300, NAS signaling is transmitted.

Note that the UE 100 includes an application layer and the like other than the protocol of the radio interface.

Conceivable Scenario

Figure 6:
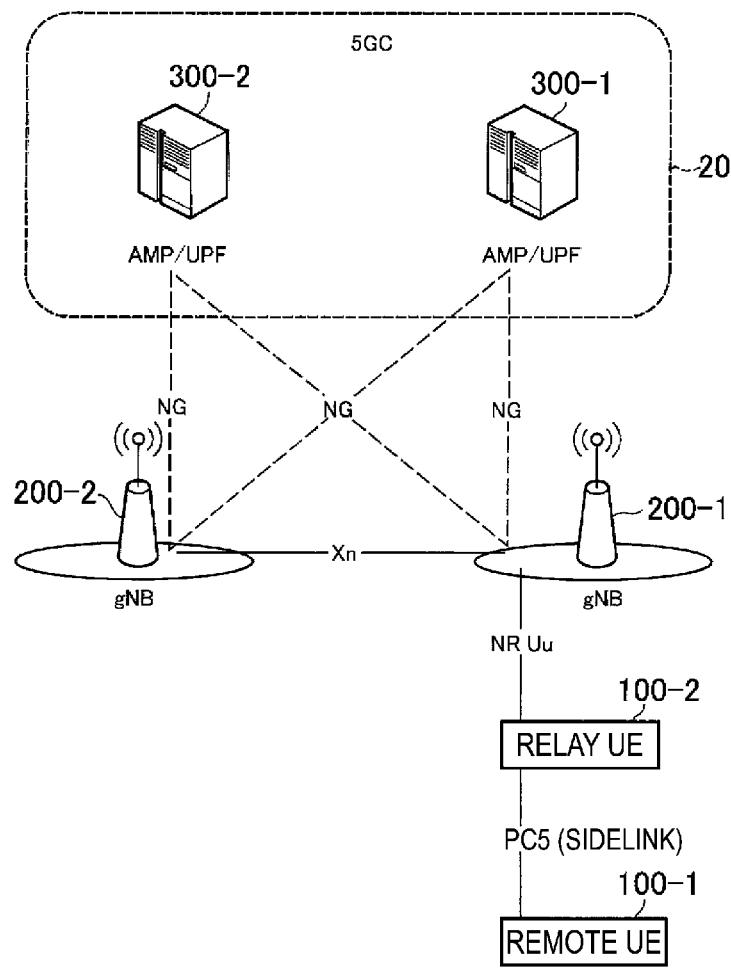
FIG. 6 is a diagram illustrating a conceivable scenario of a mobile communication system according to an embodiment.

Next, a conceivable scenario in the mobile communication system 1 according to an embodiment will be described. FIG. 6 is a diagram illustrating the conceivable scenario.

As illustrated in FIG. 6, a scenario in which relay UE 100-2 intervenes in communication between a gNB 200-1 and a remote UE 100-1 and sidelink relay relaying the communication is used will be conceived.

The remote UE 100-1 performs wireless communication (sidelink communication) with the relay UE 100-2 on a PC5 interface (sidelink), which is an inter-UE interface. The relay UE 100-2 performs wireless communication (Uu communication) with the gNB 200-1 on an NR Uu radio interface. As a result, the remote UE 100-1 indirectly communicates with the gNB 200-1 via the relay UE 100-2. Uu communication includes uplink communication and downlink communication, and, the uplink will be mainly described below.

Figure 7:
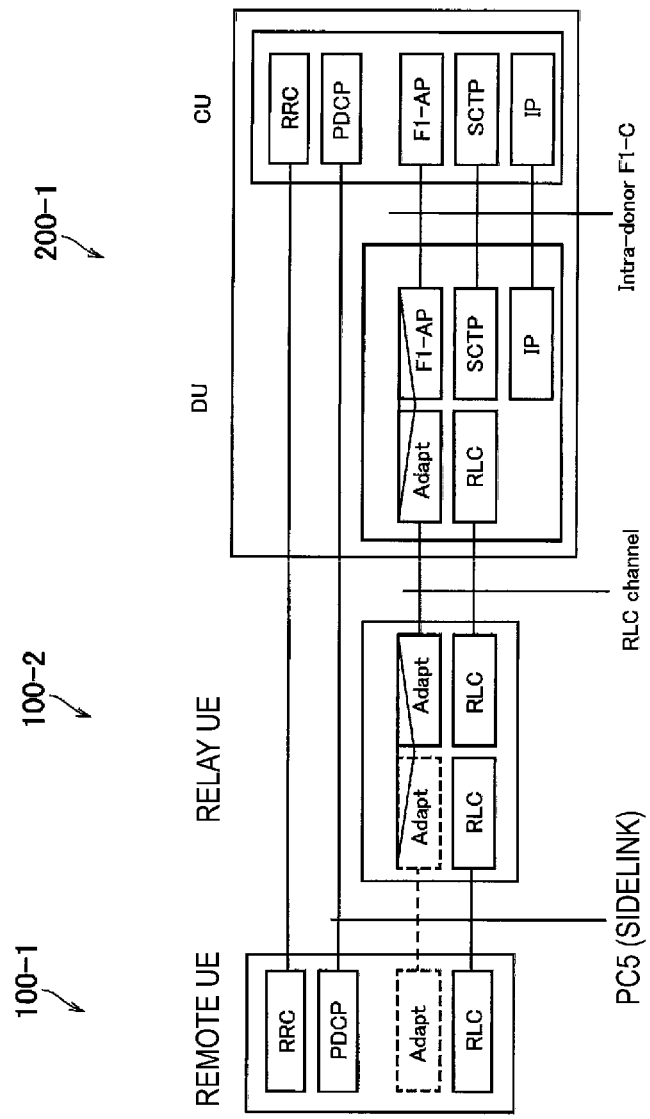
FIG. 7 is a diagram illustrating an example of a protocol stack in a conceivable scenario of a mobile communication system according to an embodiment.

FIG. 7 is a diagram illustrating an example of a protocol stack in a conceivable scenario. In FIG. 7, illustration of the MAC layer and the PHY layer that are lower layers with respect to the RLC layer is omitted.

As illustrated in FIG. 7, the gNB 200-1 is divided into the CU and the DU and includes an F1-C interface (Intra-donor F1-C) between the CU and the DU.

The PDCP layer of the CU of the gNB 200-1 and the PDCP layer of the remote UE 100-1 communicate with each other via the relay UE 100-2. The RRC layer of the CU and the RRC layer of the remote UE 100-1 also communicate with each other via the relay UE 100-2. In the DU, the relay UE 100-2, and the remote UE 100-1, an adaptation (Adapt) layer may be provided as an upper layer of the RLC layer.

Note that although illustration is omitted in FIG. 7, the RRC layer of the CU and the RRC layer of the relay UE 100-2 communicate with each other. The PDCP layer of the CU and the PDCP layer of the relay UE 100-2 communicate with each other.

Also, each of the remote UE 100-1 and the relay UE 100-2 may include an RRC layer for the PC5. Such an RRC layer will be referred to as a "PC5-RRC". The PC5-RRC layer of the remote UE 100-1 and the PC5-RRC layer of the relay UE 100-2 communicate with each other.

Operations of Mobile Communication System Operations of the mobile communication system 1 according to an embodiment will be described.

In the conceivable scenario illustrated in FIG. 6, the relay UE 100-2 receives data transmitted from the remote UE 100-1 on the sidelink and transmits the received data to the gNB 200-1 on the uplink. Here, if an uplink communication band between the relay UE 100-2 and the gNB 200-1 is insufficient, overflow of a buffer (uplink buffer) of the relay UE 100-2 may occur and communication disconnection may occur. Hereinafter, first to third operation patterns for solving such a problem will be described.

(1) First Operation Pattern

The first operation pattern includes the steps of receiving, by the relay UE 100-2, data transmitted from the remote UE 100-1 on the sidelink, transmitting, from the relay UE 100-2 to the gNB 200-1 and on the uplink, the data received from the remote UE 100-1, and transmitting, from the relay UE 100-2 to the remote UE 100-1, restriction information restricting an amount of data to be transmitted by the remote UE 100-1.

Figure 8:
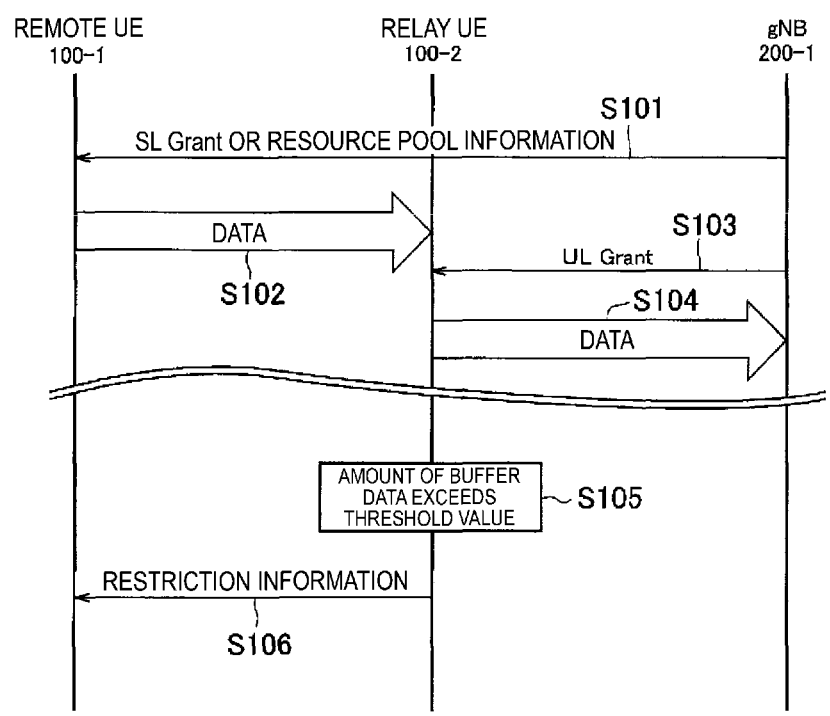
FIG. 8 is a diagram illustrating a first operation pattern according to an embodiment.

FIG. 8 is a diagram illustrating the first operation pattern according to an embodiment.

As illustrated in FIG. 8, in Step S101, the gNB 200-1 notifies the remote UE 100-1 of a sidelink radio resource to be used for transmission on the sidelink.

Step S101 may be a step of notifying the remote UE 100-1 of a resource pool (sidelink resource pool) consisting of radio resources that are candidates of the sidelink radio resource. Information indicating the resource pool (hereinafter, referred to as "resource pool information") may be included in a system information block (SIB) in which the gNB 200-1 transmits through broadcast or may be included in a dedicated RRC message that the gNB 200-1 transmits to the remote UE 100-1 through unicast.

Step S101 may be a step in which the sidelink radio resources are dynamically allocated to the remote UE 100-1. Such allocation information is referred to as sidelink grant (SL Grant). The sidelink grant may be included in Sidelink Control Information (SCI) in which the gNB 200-1 transmits to the remote UE 100-1 on a Physical Downlink Control Channel (PDCCH).

However, in a case in which the remote UE 100-1 is located outside a coverage of the gNB 200-1, the remote UE 100-1 may read the information indicating a resource pool (a resource pool for the outside of the coverage) preconfigured in the remote UE 100-1, instead of Step S101.

In Step S102, the remote UE 100-1 transmits data to the relay UE 100-2 on the sidelink. For example, the remote UE 100-1 transmits data on a Physical Sidelink Shared Channel (PSSCH). The relay UE 100-2 receives the data from the remote UE 100-1. The relay UE 100-2 stores, in the buffer (uplink buffer), data that has been received from the remote UE 100-1 and has not been transmitted to the gNB 200. The relay UE 100-2 monitors the amount of data in the uplink buffer.

Step S102 may be a step in which the remote UE 100-1 transmits data using a sidelink radio resource selected by the remote UE 100-1 from the resource pool notified from the gNB 200-1 or the resource pool preconfigured in the remote UE 100-1.

Step S102 may be a step in which the remote UE 100-1 transmits data using the sidelink radio resource allocated by the gNB 200-1 through SL Grant.

In Step S103, the gNB 200-1 notifies the relay UE 100-2 of the uplink radio resource to be used for uplink transmission. Such allocation information is referred to as uplink grant (UL Grant). The UL grant may be included in a Downlink Control Information (DCI) in which the gNB 200-1 transmits to the relay UE 100-2 on the PDCCH.

Prior to Step S103, the relay UE 100-2 may transmit, to the gNB 200-1, a buffer state report indicating the amount of data in the uplink buffer of the relay UE 100-2. The gNB 200-1 allocates an uplink radio resource to the relay UE 100-2 in consideration of the amount of data reported in the buffer state report. However, there may be a case in which it is not possible to allocate a sufficient amount of uplink radio resources to the relay UE 100-2 in a situation in which a resource load of the gNB 200-1 is high.

In Step S104, the relay UE 100-2 transmits data to the gNB 200-1 on the uplink. For example, the relay UE 100-2 transmits data on a Physical Uplink Shared Channel (PUSCH). The gNB 200-1 receives the data from the relay UE 100-2.

In this manner, a relay operation in which the relay UE 100-2 relays data from the remote UE 100-1 to the gNB 200-1 is performed. Such a relay operation may be repeatedly executed.

In Step S105, the relay UE 100-2 detects that the amount of data in the uplink buffer has exceeded a threshold value. The threshold value is a value that is equal to or less than an upper limit value of the uplink buffer. The threshold value may be preconfigured in the relay UE 100-2, or the gNB 200-1 may configure the threshold value to the relay UE 100-2.

In Step S106, the relay UE 100-2 transmits, to the remote UE 100-1, restriction information restricting the amount of data to be transmitted by the remote UE 100-1 (the amount of sidelink data transmission) in response to the amount of data in the uplink buffer having exceeded the threshold value.

Step S106 may be a step in which a predetermined layer of the relay UE 100-2 transmits, to the predetermined layer of the remote UE 100-1, a message of the predetermined layer including the restriction information. The predetermined layer may be a PHY layer, a MAC layer, an RLC layer, an adaptation layer, or a PC5-RRC layer.

The restriction information may include a restriction value (upper limit value) for the data to be transmitted from the remote UE 100-1 on the sidelink. The restriction value includes at least one selected from the group consisting of a maximum throughput (or a maximum bit rate), a maximum transport block size, a maximum number of resource blocks, and a relative value indicating the amount of reduction in the amount of data transmission. The unit of the relative value may be "%" or "bps".

The restriction information may include a restriction value per bearer or per IP flow. In a case in which the remote UE 100-1 performs sidelink data transmission using a plurality of bearers, for example, the restriction information may include the restriction value for each of the plurality of bearers. In a case in which the remote UE 100-1 performs sidelink data transmission using a plurality of IP flows, the restriction information may include the restriction value for each of the plurality of IP flows.

The restriction information may include information (hereinafter, referred to as "pool adjustment information") regarding the adjustment of the sidelink resource pool configured by the gNB 200. The pool adjustment information may be information obtained by processing resource pool information in which the relay UE 100-2 receives from the gNB 200-1. For example, the pool adjustment information is information indicating a new resource pool including some of radio resources in the sidelink resource pool configured by the gNB 200. The pool adjustment information may be information for designating the available part (narrowed-down amount) of the sidelink resource pool configured by the gNB.

The remote UE 100-1 restricts the amount of data to be transmitted to the relay UE 100-2 (the amount of sidelink data transmission) on the basis of the restriction information from the relay UE 100-2. For example, the remote UE 100-1 restricts the amount of sidelink data transmission to be equal to or less than the restriction value.

In this manner, according to the first operation pattern, it is possible to curb occurrence of overflow of the uplink buffer of the relay UE 100-2 by the relay UE 100-2 transmitting the restriction information to the remote UE 100-1.

Note that in the first operation pattern, the relay UE 100-2 may transmit, to the remote UE 100-1, information indicating that the restriction has been released after transmitting the restriction information to the remote UE 100-1. For example, the relay UE 100-2 may transmit, to the remote UE 100-1, information indicating that the restriction has been released in response to the amount of data in the uplink buffer having fallen below the threshold value. Once the releasing of the restriction is indicated by the relay UE 100-2, the remote UE 100-1 releases the restriction of the sidelink transmission to the relay UE 100-2.

(2) Second Operation Pattern

Differences of the second operation pattern from the first operation pattern will be mainly described.

The second operation pattern includes the steps of receiving, by the relay UE 100-2, data transmitted from the remote UE 100-1 on the sidelink, transmitting, from the relay UE 100-2 to the gNB 200 and on the uplink, the data received from the remote UE 100-1, and transmitting desire information (first desire information) from one UE 100 of the remote UE 100-1 and the relay UE 100-2 to the other UE 100 of the remote UE 100-1 and the relay UE 100-2. The desire information is information indicating the desired amount of data transmission to be transmitted from the remote UE 100-1 on the sidelink.

The second operation pattern may further include a step of transmitting desire information (second desire information) from the other user equipment to the one user equipment in a case in which the desired amount of transmission indicated by the first desire information is not accepted by the other user equipment.

Figure 9:
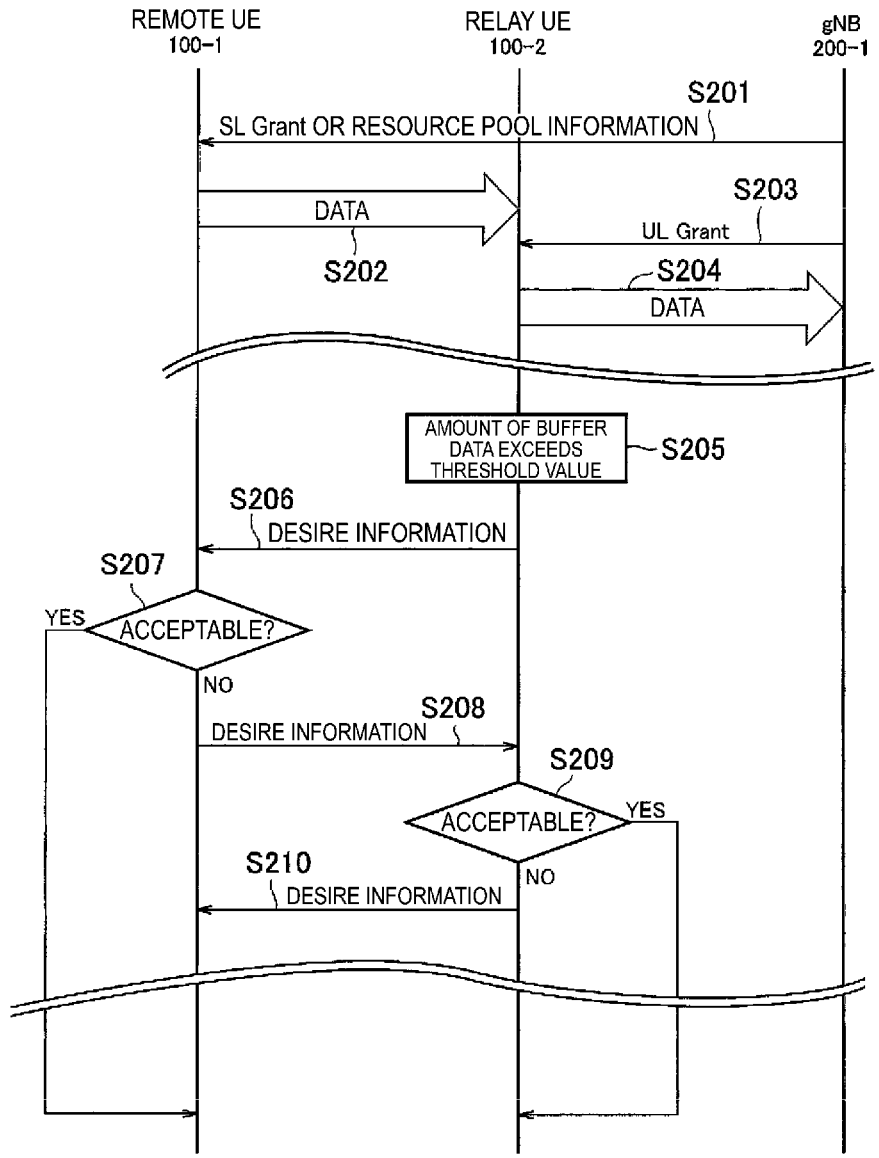
FIG. 9 is a diagram illustrating a second operation pattern according to an embodiment.

FIG. 9 is a diagram illustrating the second operation pattern according to an embodiment.

As illustrated in FIG. 9, Steps S201 to S205 are similar to Steps S101 to S105 in the first operation pattern.

In Step S206, the relay UE 100-2 transmits desire information to the remote UE 100-1 in response to the amount of data in the uplink buffer having exceeded a threshold value. As described above, the desire information is information indicating the desired amount of data transmission to be transmitted from the remote UE 100-1 on the sidelink.

Step S206 may be a step in which a predetermined layer of the relay UE 100-2 transmits, to the predetermined layer of the remote UE 100-1, a message of the predetermined layer including the desire information. The predetermined layer may be a PHY layer, a MAC layer, an RLC layer, an adaptation layer, or a PC5-RRC layer.

The desire information may include a restriction value (upper limit value) for the data to be transmitted from the remote UE 100-1 on the sidelink. The restriction value includes at least one selected from the group consisting of a maximum throughput (or a maximum bit rate), a maximum transport block size, a maximum number of resource blocks, and a relative value indicating the amount of reduction in the amount of data transmission. The unit of the relative value may be "%" or "bps".

The desire information may include a restriction value per bearer or per IP flow. In a case in which the remote UE 100-1 performs sidelink data transmission using a plurality of bearers, for example, the desire information may include the restriction value for each of the plurality of bearers. In a case in which the remote UE 100-1 performs sidelink data transmission using a plurality of IP flows, the desire information may include the restriction value for each of the plurality of IP flows.

The desire information may include pool adjustment information regarding the adjustment of the sidelink resource pool configured by the gNB 200. The pool adjustment information may be information obtained by processing resource pool information in which the relay UE 100-2 receives from the gNB 200-1. For example, the pool adjustment information is information indicating a new resource pool including some of radio resources in the sidelink resource pool configured by the gNB 200. The pool adjustment information may be information for designating the available part (narrowed-down amount) of the sidelink resource pool configured by the gNB.

In Step S207, the remote UE 100-1 determines whether the desired amount of transmission indicated by the desire information received from the relay UE 100-2, that is, the desired amount of sidelink data transmission in which the relay UE 100-2 desires from the remote UE 100-1 is acceptable. In a case in which the desired amount of transmission is acceptable (Step S207: YES), the remote UE 100-1 performs sidelink data transmission with the amount of sidelink data transmission in accordance with the desired amount of transmission indicated by the desire information received from the relay UE 100-2. In a case in which the desired amount of transmission is acceptable (Step S207: YES), the remote UE 100-1 may transmit that effect (ACK) to the relay UE 100-2 or may transmit, to the relay UE 100-2, the same desire information as the desire information received from the relay UE 100-2.

On the other hand, in a case in which the desired amount of transmission is not acceptable (Step S207: NO), the remote UE 100-1 transmits, to the relay UE 100-2, desire information indicating the desired amount of data transmission to be transmitted from the remote UE 100-1 on the sidelink in Step S208. In other words, in a case in which the remote UE 100-1 is dissatisfied with the desire of the relay UE 100-2, the remote UE 100-1 returns, to the relay UE 100-2, a notification of the desire information as an alternative of the desire of the relay UE 100-2.

In Step S209, the relay UE 100-2 determines whether the desired amount of transmission indicated by the desire information received from the remote UE 100-1, that is, the amount of sidelink data transmission in which the remote UE 100-1 desires from the relay UE 100-2 is acceptable. In a case in which the desired amount of transmission is acceptable (Step S209: YES), the relay UE 100-2 may transmit that effect (ACK) to the remote UE 100-1 or may transmit, to the remote UE 100-1, the same desire information as the desire information received from the remote UE 100-1.

On the other hand, in a case in which the desired amount of transmission is not acceptable (Step S209: NO), the relay UE 100-2 transmits, to the remote UE 100-1, desire information indicating the desired amount of data transmission to be transmitted from the remote UE 100-1 on the sidelink in Step S210. In other words, in a case in which the relay UE 100-2 is dissatisfied with the desire of the remote UE 100-1, the relay UE 100-2 returns, to the remote UE 100-1, a notification of the desire information as an alternative of the desire of the remote UE 100-1.

Such negotiation is continued until the remote UE 100-1 or the relay UE 100-2 accepts the desire information.

Note that in the operation example in FIG. 9, the remote UE 100-1 and the relay UE 100-2 transmit and receive desire information after establishing sidelink communication. However, the remote UE 100-1 and the relay UE 100-2 may transmit and receive the desire information when sidelink communication is established. In other words, the transmission and the reception of the desire information may be performed before the sidelink data transmission from the remote UE 100-1 to the relay UE 100-2 is started. Additionally, the transmission of the desire information is not limited to a case in which the transmission of the desire information is first performed by the relay UE 100-2, and the transmission of the desire information may be first performed by the remote UE 100-1.

In this manner, according to the second operation pattern, it is possible to curb occurrence of overflow of the uplink buffer of the relay UE 100-2 by one UE 100 of the remote UE 100-1 and the relay UE 100-2 transmitting the desire information to the other UE 100 of the remote UE 100-1 and the relay UE 100-2.

(3) Third Operation Pattern

Figure 10:
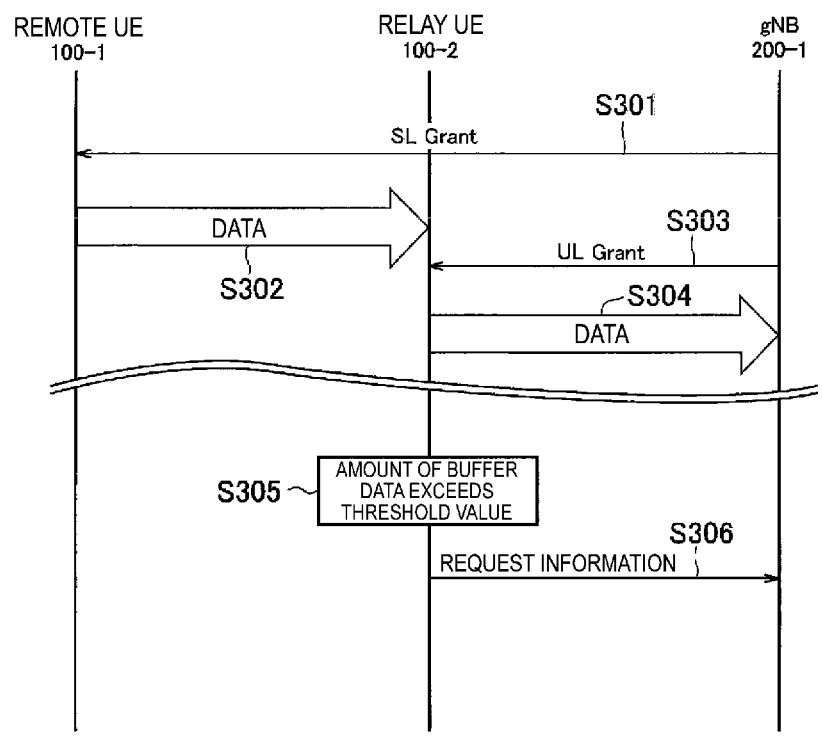
FIG. 10 is a diagram illustrating a third operation pattern according to an embodiment.

Differences of the third operation pattern from the first and second operation patterns will be mainly described. FIG. 10 is a diagram illustrating the third operation pattern according to an embodiment.

The third operation pattern includes the steps of receiving, by the relay UE 100-2, data transmitted from the remote UE 100-1 on the sidelink using a sidelink radio resource allocated by the gNB 200, transmitting, from the relay UE 100-2 to the gNB 200 and on the uplink, the data received from the remote UE 100-1, and transmitting, from the relay UE 100-2 to the gNB 200 and on the uplink, request information requesting an adjustment (reduction, for example) of an amount of sidelink radio resources.

As illustrated in FIG. 10, Steps S301 to S305 are similar to Steps S101 to S105 in the first operation pattern. However, Step S301 is assumed to be a step in which the sidelink radio resource is dynamically allocated to the remote UE 100-1 through sidelink grant.

In Step S306, the relay UE 100-2 transmits, to the gNB 200 and on the uplink, request information requesting the adjustment of the amount of sidelink radio resources in response to the amount of data in the uplink buffer having exceeded a threshold value.

Step S306 may be a step in which a predetermined layer of the relay UE 100-2 transmits, to the predetermined layer of the gNB 200-1, a message of the predetermined layer including the request information. The predetermined layer may be a PHY layer, a MAC layer, an RLC layer, an adaptation layer, or an RRC layer. The message may be a Sidelink UE Information message that is a message of the RRC layer.

The request information may include a restriction value (upper limit value) for the data to be transmitted from the remote UE 100-1 on the sidelink. The restriction value includes at least one selected from the group consisting of a maximum throughput (or a maximum bit rate), a maximum transport block size, a maximum number of resource blocks, and a relative value indicating the amount of reduction in the amount of data transmission. The unit of the relative value may be "%" or "bps".

The request information may include a restriction value per bearer or per IP flow. In a case in which the remote UE 100-1 performs sidelink data transmission using a plurality of bearers, for example, the request information may include the restriction value for each of the plurality of bearers. In a case in which the remote UE 100-1 performs sidelink data transmission using a plurality of IP flows, the request information may include the restriction value for each of the plurality of IP flows.

The request information may include pool adjustment information regarding the adjustment of the sidelink resource pool configured by the gNB 200. The pool adjustment information may be information obtained by processing resource pool information in which the relay UE 100-2 receives from the gNB 200-1. For example, the pool adjustment information is information indicating a new resource pool including some of radio resources in the sidelink resource pool configured by the gNB 200. The pool adjustment information may be information for designating the available part (narrowed-down amount) of the sidelink resource pool configured by the gNB.

The gNB 200-1 restricts the amount of sidelink radio resources allocated to the relay UE 100-2 on the basis of the request information from the relay UE 100-2. For example, the gNB 200-1 allocate the sidelink radio resource to the remote UE 100-1 through sidelink grant to make the amount of sidelink data transmission equal to or less than the restriction value.

Note that the gNB 200-1 may transmit a positive acknowledgment (ACK) to the relay UE 100-2 when accepting the request information from the relay UE 100-2. On the other hand, the gNB 200-1 may transmit a negative acknowledgment (NACK) to the relay UE 100-2 when not accepting the request information from the relay UE 100-2.

In this manner, according to the third operation pattern, it is possible to curb occurrence of overflow of the uplink buffer of the relay UE 100-2 by the relay UE 100-2 transmitting, to the gNB 200 and on the uplink, the request information requesting the adjustment of the amount of sidelink radio resources.

Note that in the third operation pattern, the relay UE 100-2 may transmit, to the gNB 200-1, information indicating that the request has been canceled after transmitting the request information to the gNB 200-1. For example, the relay UE 100-2 may transmit, to the gNB 200-1, information indicating that the request has been canceled in response to the amount of data in the uplink buffer having fallen below the threshold value. Once the cancellation of the request is indicated by the relay UE 100-2, the gNB 200-1 releases the restriction of the allocation of the sidelink radio resource to the remote UE 100-1.

Other Embodiments

In the aforementioned first operation pattern, an example in which the restriction information is information for restricting the amount of data to be transmitted by the remote UE 100-1 has been described. However, the restriction information may be information (notification) inhibiting data transmission of the remote UE 100-1. The remote UE 100-1 stops sidelink transmission to the relay UE 100-2 when receiving such restriction information. Here, the restriction information may include time information indicating a time inhibiting the transmission. The time information may be information indicating a time length during which the transmission is inhibited or may be information indicating a timing at which the transmission is inhibited. The unit of the time indicated by the time information may be a second, a radio frame, a sub-frame, or the like.

After transmitting such restriction information to the remote UE 100-1, the relay UE 100-2 may transmit information (notification) indicating transmission permission to the remote UE 100-1. The information indicating transmission permission may be information indicating restriction release. If the relay UE 100-2 indicates transmission permission (restriction release), the remote UE 100-1 starts (resumes) sidelink transmission to the relay UE 100-2.

In the aforementioned third operation pattern, an example in which the request information is information requesting the adjustment (reduction, for example) of the amount of sidelink radio resources to be allocated to the remote UE 100-1 from the gNB 200-1 has been described. However, the request information may be information requesting inhibition of allocation of the sidelink radio resource to the remote UE 100-1 from the gNB 200-1. The gNB 200-1 stops the allocation of the sidelink radio resource to the remote UE 100-1 when receiving such request information. Here, the request information may include time information indicating a time inhibiting the allocation of the sidelink radio resource. The time information may be information indicating a time length during which the allocation of the sidelink radio resource is inhibited or may be information indicating a timing at which the allocation of the sidelink radio resource is inhibited. The unit of the time indicated by the time information may be a second, a radio frame, a sub-frame, or the like.

After transmitting such request information to the gNB 200-1, the relay UE 100-2 may transmit information (notification) indicating permission of allocation of the sidelink radio resource to the gNB 200-1. The information indicating the permission may be information indicating cancellation of the request. Once the relay UE 100-2 indicates the permission (cancellation of the request), the gNB 200-1 starts (resumes) the allocation of the sidelink radio resource to the remote UE 100-1.

Although operations of the relay UE 100-2 have mainly been described in the aforementioned embodiment, the operations according to the aforementioned embodiment may be applied to an Integrated Access and Backhaul (IAB) node that is a radio relay node. Specifically, the IAB node may perform the operations of the relay UE 100-2 described in the aforementioned embodiment. In such an embodiment, the "relay UE" in the aforementioned embodiment is read as the "IAB node" instead, and the "sidelink" in the aforementioned embodiment is read as an "access link" instead.

A program causing a computer to execute each of the processing operations performed by the UE 100 or the gNB 200 may be provided. The program may be recorded in a computer readable medium. Use of the computer readable medium enables the program to be installed on a computer. Here, the computer readable medium on which the program is recorded may be a non-transitory recording medium. The non-transitory recording medium is not particularly limited, and may be, for example, a recording medium such as a CD-ROM, a DVD-ROM, or the like.

In addition, circuits for executing the processing operations to be performed by the UE 100 or the gNB 200 may be integrated, and at least part of the UE 100 or the gNB 200 may be configured as a semiconductor integrated circuit (a chipset or an SoC).

Embodiments have been described above in detail with reference to the drawings, but specific configurations are not limited to those described above, and various design modifications can be made without departing from the gist of the present embodiment.

The invention claimed is:

1. A communication control method comprising:
   receiving, by a relay user equipment, data transmitted from a remote user equipment on a sidelink;
   transmitting, from the relay user equipment to a base station and on an uplink, the data received from the remote user equipment;
   transmitting first desire information from one user equipment out of the remote user equipment and the relay user equipment to the other user equipment out of the remote user equipment and the relay user equipment,
   wherein the first desire information is information indicating a desired amount of data transmission to be transmitted from the remote user equipment on the sidelink; and
   transmitting second desire information from the other user equipment to the one user equipment in a case in which the desired amount of transmission indicated by the first desire information is not accepted by the other user equipment,
   wherein the second desire information is information indicating a desired amount of data transmission to be transmitted from the remote user equipment on the sidelink.

2. The communication control method according to claim 1, further comprising
   storing, by the relay user equipment and in a buffer, data that has not been transmitted to the base station, the data having been received from the remote user equipment,
   wherein the transmitting the first desire information comprises transmitting, from the relay user equipment to the remote user equipment, the first desire information based on a state of the buffer.

3. The communication control method according to claim 1,
   wherein the first desire information comprises a restriction value for data to be transmitted from the remote user equipment on the sidelink or information on an adjustment of a sidelink resource pool configured by the base station, and
   the restriction value comprises at least one selected from the group consisting of a maximum throughput, a maximum transport block size, a maximum number of resource blocks, and a relative value indicating an amount of reduction in an amount of data transmission.

4. The communication control method according to claim 3,
   wherein the first desire information comprises the restriction value per bearer or per IP flow.

5. A relay user equipment comprising:
   a receiver configured to receive data transmitted from a remote user equipment on a sidelink, and
   a transmitter configured to transmit to a base station on an uplink, the data received from the remote user equipment, wherein
   the receiver is configured to receive first desire information from the remote user equipment,
   the first desire information indicates a desired amount of data transmission to be transmitted from the remote user equipment on the sidelink,
   the transmitter is configured to transmit second desire information to the remote user equipment in a case where the first desire information is received from the remote user equipment and the desired amount of transmission indicated by the first desire information is not accepted by the relay user equipment, and
   the second desire information indicates a desired amount of data transmission to be transmitted from the remote user equipment on the sidelink.

* * * * *